(12) United States Patent
Holmes et al.

(10) Patent No.: US 7,365,857 B2
(45) Date of Patent: Apr. 29, 2008

(54) PRECOMPENSATION OF POLARIZATION ERRORS IN HETERODYNE INTERFEROMETRY

(75) Inventors: Michael Lowell Holmes, Lebanon, CT (US); Andrew Eric Carlson, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 389 days.

(21) Appl. No.: 11/255,766

(22) Filed: Oct. 21, 2005

(65) Prior Publication Data

US 2006/0087657 A1 Apr. 27, 2006

Related U.S. Application Data

(60) Provisional application No. 60/621,334, filed on Oct. 22, 2004.

(51) Int. Cl.
*G01B 11/02* (2006.01)
(52) U.S. Cl. ...................................... 356/487
(58) Field of Classification Search ............... 356/486, 356/487, 493
See application file for complete search history.

(56) References Cited

U.S. PATENT DOCUMENTS

| | | | | |
|---|---|---|---|---|
| 5,331,400 A * | 7/1994 | Wilkening et al. | ........... | 356/487 |
| 6,137,574 A * | 10/2000 | Hill | ........... | 356/486 |
| 6,181,420 B1 * | 1/2001 | Badami et al. | ........... | 356/487 |
| 6,757,066 B2 * | 6/2004 | Hill | ........... | 356/493 |
| 6,778,280 B2 * | 8/2004 | De Groot et al. | ........... | 356/493 |
| 6,806,961 B2 * | 10/2004 | Hill | ........... | 356/487 |
| 6,922,249 B1 * | 7/2005 | Ames et al. | ........... | 356/496 |
| 6,950,192 B2 * | 9/2005 | Hill | ........... | 356/498 |
| 2003/0007156 A1 * | 1/2003 | De Groot et al. | ........... | 356/487 |
| 2003/0164948 A1 * | 9/2003 | Hill | ........... | 356/487 |
| 2003/0218757 A1 | 11/2003 | Hill | | |
| 2004/0085545 A1 * | 5/2004 | Hill | ........... | 356/498 |
| 2005/0018206 A1 * | 1/2005 | Hill | ........... | 356/498 |
| 2005/0094155 A1 * | 5/2005 | Hill et al. | ........... | 356/500 |
| 2005/0166118 A1 * | 7/2005 | Demarest et al. | ........... | 714/746 |
| 2006/0061771 A1 * | 3/2006 | Hill | ........... | 356/510 |
| 2006/0072119 A1 * | 4/2006 | Hill et al. | ........... | 356/500 |
| 2007/0223005 A1 * | 9/2007 | Lee | ........... | 356/487 |

OTHER PUBLICATIONS

Lay, O.P. and Dubovitsky, S., "Polarization compensation: a passive approach to a reducing heterodyne interferometer nonlinearity," *Optics Letters* 27: 797-799 (May 15, 2002).

Pottiez, O. et al., "Easily tuneable nonlinear optical loop mirror including low-birefringence, highly twisted fibre with invariant output polarization," *Optics Communications* 229: 147-159 (2004).

* cited by examiner

*Primary Examiner*—Patrick Connolly
(74) *Attorney, Agent, or Firm*—Fish & Richardson P.C.

(57) ABSTRACT

Apparatus and methods for adjusting the polarizations of the components of an input beam to reduce leakage caused by imperfections in an interferometer are disclosed. The apparatus includes an interferometer positioned to receive an input beam that includes two components having different frequencies and different polarizations, the interferometer including a polarizing beam splitter positioned to spatially separate the input beam into two intermediate beams, the first intermediate beam corresponding to the first component and the second intermediate beam corresponding to the second component, where imperfections in the interferometer cause leakage of one of the components into the intermediate beam corresponding to the other of the components. The apparatus further includes a polarization compensator that includes at least one retardation plate positioned to adjust the polarizations of the components of the input beam to reduce the leakage caused by the imperfections in the interferometer.

41 Claims, 6 Drawing Sheets

PRECOMPENSATION OF POLARIZATION ERRORS IN HETERODYNE INTERFEROMETRY

CROSS-REFERENCE TO RELATED APPLICATIONS

This application claims priority to U.S. Provisional Application No. 60/621,334, filed on Oct. 22, 2004, the contents of which are incorporated herein by reference.

TECHNICAL FIELD

This invention relates to interferometry and interferometer systems. For example, the invention relates to polarizations of optical beams used in displacement and dispersion measuring interferometry systems.

BACKGROUND

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object. Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors." The cyclic errors can be expressed as contributions to the phase and/or the intensity of the measured interference signal and have a sinusoidal dependence on the change in optical path length pnL. In particular, the first harmonic cyclic error in phase has a sinusoidal dependence on $(2\pi pnL)/\lambda$ and the second harmonic cyclic error in phase has a sinusoidal dependence on $2(2\pi pnL)/\lambda$. Higher harmonic cyclic errors and sub-harmonic cyclic errors can also be present.

Cyclic errors may arise in interferometers from one or more of various sources. For example, in some interferometers, cyclic errors may arise from imperfections in a polarizing beam splitter cube used to separate the components of an incident optical beam into a measurement beam and a reference beam. Nominally, the optical beam may include two beam components having different frequencies, the components further being orthogonally polarized relative to one another. However, the polarization orientations of the beam components coming from the heterodyne source may not be perfectly aligned with the s and p polarization directions of the beam splitter cube, and may in some cases be rotated with respect to the s and p directions. Alternatively, or in addition, either or both of the polarization directions of the optical beam components may change on passing through the optical elements of the system, such as the beam splitter cube for example, due to birefringence in the optical elements. Furthermore, misalignment of optical components in an interferometer or interferometry system may occur over time. Any of these sources of error may lead to leakage of a portion of one beam component into a measurement or reference beam that nominally corresponds only to the other beam component. In some cases, portions of each beam component may be present in both the measurement and reference beams. Leakage of beam components into the measurement and/or reference beams may produce cyclic errors in measured interferometry data.

In dispersion measuring applications, optical path length measurements are made at multiple wavelengths, e.g., 532 nm and 1064 nm, and are used to measure the dispersion of a gas in the measurement path of a displacement measuring interferometer. The dispersion measurement can be used in converting an optical path length measured by a displacement measuring interferometer into a physical length. Such a conversion can be important since changes in the measured optical path length can be caused by gas turbulence and/or by a change in the average density of the gas in the measurement arm even though the physical distance to the measurement object is unchanged.

The interferometers described above are often crucial components of scanner systems and stepper systems used in lithography to produce integrated circuits on semiconductor wafers. Such lithography systems typically include a translatable stage to support and fix the wafer, focusing optics used to direct a radiation beam onto the wafer, a scanner or stepper system for translating the stage relative to the exposure beam, and one or more interferometers. Each interferometer directs a measurement beam to, and receives a reflected measurement beam from, a plane mirror attached to the stage. Each interferometer interferes its reflected measurement beam with a corresponding reference beam, and collectively the interferometers accurately measure changes in the position of the stage relative to the radiation beam. The interferometers enable the lithography system to precisely control which regions of the wafer are exposed to the radiation beam.

In many lithography systems and other applications, the measurement object includes one or more plane mirrors to reflect the measurement beam from the measurement object. Small changes in the angular orientation of the measurement object, e.g., pitch and yaw of a stage, can alter the direction of each measurement beam reflected from the plane mirrors. If left uncompensated, the altered measurement beams reduce the overlap of the exit measurement and reference beams in each corresponding interferometer. Furthermore, these exit measurement and reference beams will not be propagating parallel to one another nor will their wave fronts be aligned when forming the mixed beam. As a result, the interference between the exit measurement and reference beams will vary across the transverse profile of the mixed beam, thereby corrupting the interference information encoded in the optical intensity measured by the detector.

To address this problem, many conventional interferometers include a retroreflector that redirects the measurement beam back to the plane mirror so that the measurement beam "double passes" the path between the interferometer and the measurement object. The presence of the retroreflector ensures that the direction of the exit measurement is insensitive to changes in the angular orientation of the measurement object. When implemented in a plane mirror interferometer, the configuration results in what is commonly referred to as a high-stability plane mirror interferometer (HSPMI). However, even with the retroreflector, the lateral position of the exit measurement beam remains sensitive to changes in the angular orientation of the measurement object. Furthermore, the path of the measurement beam through optical elements within the interferometer also remains sensitive to changes in the angular orientation of the measurement object.

SUMMARY

In general, in one aspect, the invention features an apparatus including: (i) an interferometer positioned to receive an input beam that includes two components having different frequencies and different polarizations, the interferometer including a polarizing beam splitter positioned to spatially separate the input beam into two intermediate beams, the first intermediate beam corresponding to the first component and the second intermediate beam corresponding to the second component, where imperfections in the interferometer cause leakage of one of the components into the intermediate beam corresponding to the other component; and (ii) a polarization compensator including at least one retardation plate positioned to adjust the polarizations of the components of the input beam to reduce the leakage caused by the imperfections in the interferometer.

Embodiments of the apparatus may include any of the following features.

Leakage may include leakage from the first component into the second intermediate beam and leakage from the second component into the first intermediate beam.

The at least one retardation plate may be secured to an adjustable stage configured to adjust an orientation of the retardation plate. The stage may be configured to rotate the retardation plate about an axis defined by the direction of the input beam. Alternatively, the stage may be configured to tilt the retardation plate with respect to an axis defined by the direction of the input beam. The stage may be configured to rotate and tilt the retardation plate.

The retardation plate may include a half wave plate or a quarter wave plate.

The at least one retardation plate may include multiple retardation plates. The multiple retardation plates may include a half wave plate and a quarter wave plate. Alternatively, the multiple wave plates may include a half wave plate and a birefringent film, or the multiple wave plates may include a half wave plate and a liquid crystal retarder.

The interferometer may be a single-axis interferometer or a multi-axis interferometer. The interferometer may further be a distance measuring interferometer. The interferometer may be configured to combine the two intermediate beams after they have traveled along different paths to produce an output beam. One of the intermediate beams may contact a measurement object, and the output beam may include information about changes in the position of the measurement object. The apparatus may further include a detector positioned to measure an intensity signal of the output beam and an electronic processor coupled to the detector and configured to generate a frequency spectrum corresponding to the intensity signal. The electronic processor may be further configured to cause an adjustment of an orientation of the retardation plate to reduce the leakage based on the frequency spectrum.

The apparatus may include a source for the input beam.

The apparatus may include a beam stop configured to adjustably block the path of one of the intermediate beams between the interferometer and a measurement object.

Imperfections may include unwanted birefringence in one or more components of the interferometer. Alternatively, or in addition, imperfections may include misalignment between different components of the interferometer. Further in the alternative or in addition, imperfections may include misalignment of one or more components of the interferometer with one or more components in a source for the input beam.

A lithography system for use in fabricating integrated circuits on a wafer may include a stage for supporting the wafer, an illumination system for imaging spatially patterned radiation onto the wafer, a positioning system for adjusting the position of the stage relative to the imaged radiation, and the interferometer apparatus configured to monitor the position of the wafer relative to the imaged radiation. A method for fabricating integrated circuits may include using the lithography system.

A lithography system for use in fabricating integrated circuits on a wafer may include a stage for supporting the wafer and an illumination system including a radiation source, a mask, a positioning system, a lens assembly, and the interferometer apparatus, where during operation the source directs radiation through the mask to produce spatially patterned radiation, the positioning system adjusts the position of the mask relative to the radiation from the source, the lens assembly images the spatially patterned radiation onto the wafer, and the interferometer apparatus monitors the position of the mask relative to the radiation from the source. A method for fabricating integrated circuits may include using the lithography system.

A beam writing system for use in fabricating a lithography mask may include a source providing a write beam to pattern a substrate, a stage supporting the substrate, a beam directing assembly for delivering the write beam to the substrate, a positioning system for positioning the stage and beam directing assembly relative to one another, and the interferometer apparatus configured to monitor the position of the stage relative to the beam directing assembly.

A lithography method for use in fabricating integrated circuits on a wafer may include supporting the wafer on a movable stage, imaging spatially patterned radiation onto the wafer, adjusting the position of the stage, and monitoring the position of the stage using the interferometer apparatus. The lithography method may be used to fabricate integrated circuits.

A lithography method for use in the fabrication of integrated circuits may include directing input radiation through a mask to produce spatially patterned radiation, positioning the mask relative to the input radiation, monitoring the position of the mask relative to the input radiation using the interferometer apparatus, and imaging the spatially patterned radiation onto a wafer. The lithography method may be used to fabricate integrated circuits.

A lithography method for fabricating integrated circuits on a wafer may include positioning a first component of a lithography system relative to a second component of a lithography system to expose the wafer to spatially patterned radiation, and monitoring the position of the first component relative to the second component using the interferometer apparatus. The lithography method may be used to fabricate integrated circuits.

A method for fabricating a lithography mask may include directing a write beam to a substrate to pattern the substrate, positioning the substrate relative to the write beam, and, monitoring the position of the substrate relative to the write beam using the interferometer apparatus.

In general, in another aspect, the invention features a method comprising: (i) measuring an interference signal from an interferometer positioned to receive an input beam including two components having different frequencies and different polarizations, the interferometer including a polarizing beam splitter positioned to spatially separate the input beam into two intermediate beams, the first intermediate beam corresponding to the first component and the second intermediate beam corresponding to the second component, where imperfections in the interferometer cause leakage of one of the components into the intermediate beam corresponding to the other of the components; and (ii) adjusting a polarization compensator based on the measured interference signal, the polarization compensator including at least one retardation plate positioned prior to the polarizing beam splitter in the interferometer and configured to adjust the polarizations of the components of the input beam to reduce the leakage caused by the imperfections in the interferometer.

Embodiments of the method may include any of the following features.

The polarization compensator may be adjusted based on an intensity of one or more spectral peaks in the interference signal. For example, the polarization compensator may be adjusted based on the intensity of a heterodyne frequency peak in the interference signal when a measurement beam path or a reference beam path in the interferometer is blocked.

The at least one retardation plate may include a half wave plate and a quarter wave plate, and adjusting the polarization compensator may include rotating at least one of the half wave plate and the quarter wave plate about an axis nominally parallel to the propagation direction of the input beam.

The at least one retardation plate may include a half wave plate and a birefringent film, and adjusting the polarization compensator may include rotating at least one of the half wave plate and the birefringent film about an axis nominally parallel to the propagation direction of the input beam.

The at least one retardation plate may include a half wave plate and a liquid crystal retarder, and adjusting the polarization compensator may include at least one of rotating the half wave plate about an axis nominally parallel to the propagation direction of the input beam, and changing an optical property of the liquid crystal retarder.

Unless otherwise defined, all technical and scientific terms used herein have the same meaning as commonly understood by one of ordinary skill in the art to which this invention belongs.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
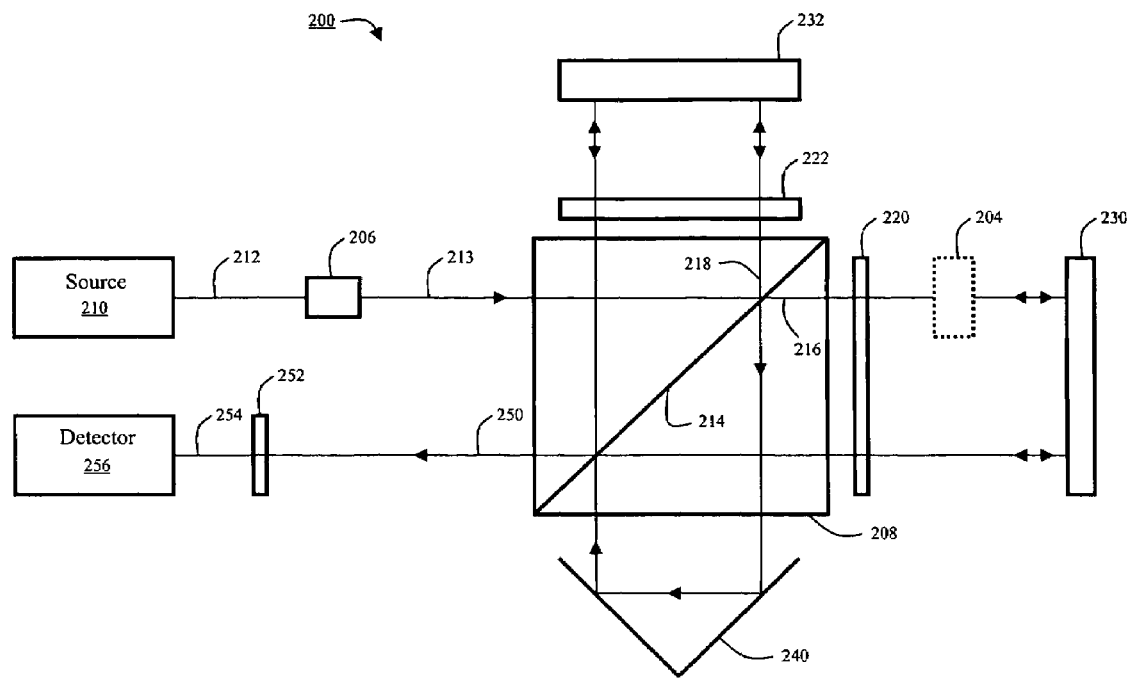
FIG. 1 is a schematic diagram of an displacement measuring interferometry system that includes a polarization compensator.

FIG. 1 shows a high stability plane mirror interferometer system 200 that includes a polarization compensator 206. A heterodyne distance measuring interferometer (DMI) light source 210 produces a source beam 212 having two beam components with nominally orthogonal polarizations and frequencies $f_1$ and $f_2$. For example, the beam component with frequency $f_1$ is nominally linearly polarized in the plane of the figure and the beam component with frequency $f_2$ is nominally linearly polarized in a direction perpendicular to the plane of the figure. Source beam 212 passes through a polarization compensator 206 prior to reaching the interferometer. The polarization compensator adjusts the polarization properties of the components of source beam 212 to produce beam 213, which is incident on the interferometer.

The interferometer includes a polarization beam splitter cube 208 having a polarizing beam splitting interface 214. During normal operation, there is no beam block 204 and the polarization beam splitting interface 214 separates the heterodyne beam 213 into two different beams 216 and 218, each corresponding to one of the components of source beam 212. The two beams are referred to as the measurement and reference beams, respectively.

Measurement beam 216, which is nominally linearly polarized, is transmitted by interface 214 and reflects from a target mirror 230 (e.g., the stage mirror of microlithography tool) back toward interface 214. A measurement path quarter wave plate 220 is positioned between interface 214 and target mirror 230. Measurement beam 216 double passes quarter wave plate 220, which rotates the polarization of measurement beam 216 so that polarization beam splitting interface 214 now reflects measurement beam 216, thereby directing it to a retroreflector 240, which in turn returns measurement beam 216 to interface 214, which in turn reflects it back to target mirror 230 for a second time. The target mirror reflects measurement beam 216 back to interface 214, which now transmits it because measurement beam 216 again double passes measurement path quarter wave plate 220.

Reference beam 218, which is also nominally linearly polarized, is reflected by interface 214 to a reference mirror 232. A reference path quarter wave plate 222 is positioned between interface 214 and reference mirror 232. Reference beam 218 double passes quarter wave plate 222, which rotates the polarization of the reference beam so that polarization beam splitting interface 214 now transmits reference beam 218, thereby directing it to retroreflector 240, which in turn returns reference beam 218 to interface 214, which in turns transmits reference beam 218 back to reference mirror 232 for a second a time. Reference mirror 232 reflects reference beam 218 back to interface 214, which now reflects reference beam 218 because reference beam 218 again double passes reference path quarter wave plate 222.

As a result, interface 214 recombines the measurement and reference beams after their respective passes to the target and reference mirrors to form heterodyne output beam 250. A polarizer 252 then mixes the polarizations of the components of the heterodyne output beam to produce a mixed beam 254 having an optical interference signal that is detected by a detector 256. Changes in the relative position of the target mirror may be determined by monitoring changes in the phase of the interference signal at a frequency corresponding to a difference frequency between the measurement and reference beams.

As discussed above, measurement beam 216 nominally includes only the first of the components of source beam 212 having frequency $f_1$, and reference beam 218 nominally includes only the second of the components of source beam 212 having frequency $f_2$. However, imperfections in source beam 212 and in the optical elements of the interferometry system may cause some leakage of the second component of source beam 212 into measurement beam 216, and/or some leakage of the first component of source beam 212 into reference beam 218. Such imperfections can be caused by, for example, birefringence in the polarizing beam splitter cube or other optical elements in the interferometer, imperfections in the polarizing beam splitter coating, misalignment of the interferometer components, or misalignment of optical elements in light source 210 relative to the interferometer components. Leakage of either of the components of source beam 212 into the measurement/reference beam corresponding to the other component may lead to spurious contributions to the interference signal produced by the interferometer, thereby making it more difficult to determine the position of target mirror 230 by analyzing the interference signal.

To reduce the effects of such imperfections, system 200 includes polarization compensator 206, which adjusts the polarizations of the frequency components of source beam 212 to reduce the amount of leakage of each one of the components into the measurement/reference beam corresponding to the other one of the components at interface 214. For example, in some embodiments, if the polarization beam splitter cube 208 is birefringent and introduces some ellipticity into heterodyne beam 213 that causes polarization leakage, polarization compensator 206 can be adjusted to produce the effect of an opposite amount birefringence to pre-compensate heterodyne beam 213. In some embodiments, for example, if there is some misalignment of the polarization axes of the components of source beam 212 at polarizing beam splitting interface 214, polarization compensator 206 may be adjusted to produce a rotation of the linear polarizations of the components of source beam 212 to generate a heterodyne beam 213 having nominally linearly polarized components where the polarization directions of the components align more closely with the polarization axes of the polarizing beam splitting interface 214.

Figure 2:
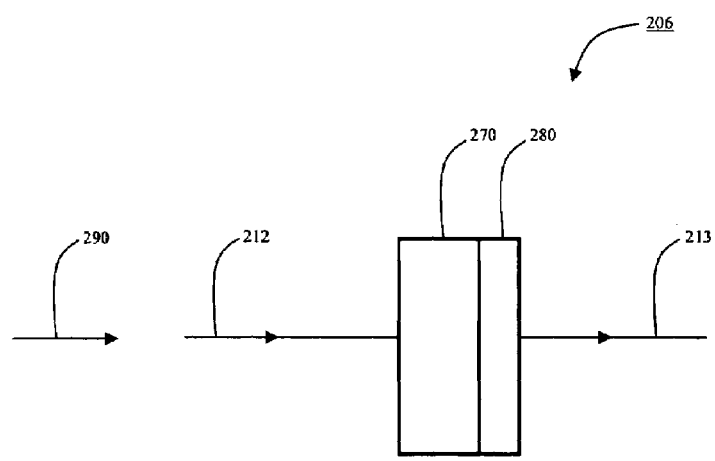
FIG. 2 is a schematic diagram of an embodiment of a polarization compensator.

FIG. 2 shows a schematic diagram of an embodiment of a polarization compensator 206. Polarization compensator 206 includes a first element 270 and a second element 280. Source beam 212 is incident on first element 270 and then on second element 280, and is transmitted as heterodyne beam 213. Elements 270 and 280 are independently rotatable about an axis 290 that may nominally coincide with the propagation direction of source beam 212, for example.

In some embodiments, either one or both of elements 270 and 280 may be configured to produce a rotation of the linear polarizations of the components of source beam 212. For example, either one or both of elements 270 and 280 may be half wave plates. Where both of the elements are half wave plates, for example, one can be configured for a coarse adjustment and the other can be configured for a fine adjustment.

In some embodiments, either one or both of elements 270 and 280 may be configured to impart some ellipticity to the polarizations of the components of source beam 212. For example, either one or both of elements 270 and 280 may be quarter wave plates, or other birefringent elements, configured to impart ellipticity to optical beams.

In some embodiments, one of the elements may be used, for example, to produce a rotation of the linear polarization components of source beam 212, and the other element may be used to impart ellipticity to the polarizations of the beam components. For example, polarization compensator 206 may include a half wave plate and a quarter wave plate supported in a housing that enables independent adjustment of the orientation of each element relative to the heterodyne input beam.

In some embodiments, both coarse and fine control over the output polarization state of the components of source beam 212 may be achieved using polarization compensator 206. For example, polarization compensator 206 may include a half wave plate and a quarter wave plate, each with independent means of rotation. The half wave plate may be used for coarse rotation of the polarizations of the components of source beam 212, and the quarter wave plate may be used to achieve fine control over the output polarization states of the components of source beam 212 by introducing a variable ellipticity to the polarizations. In some other embodiments, for example, the quarter wave plate may be replaced by one or more alternative elements capable of producing a variable ellipticity in the polarizations of the components of source beam 212, such as a liquid crystal variable retarder or a birefringent thin film.

In general, polarization compensator 206 can include any combination of one or more (e.g., two or more, three or more, four or more) components for adjusting polarization, including, for example, birefringent elements such as retardation plates (e.g., half wave plates, quarter wave plates), tunable liquid crystal cells, acousto-optical modulators, and electro-optic modulators. The combination of one or more components can be used to compensate source beam 212 for polarization effects that arise when source beam 212 is generated. For example, the polarization compensator can be adjusted to compensate for imperfections that arise because one or more components in the interferometer is misaligned relative to the polarizations produced by the heterodyne light source. In addition, the combination of one or more components in polarization compensator 206 can be adjusted to pre-compensate the beam components of source beam 212 for polarization effects, such as birefringence for example, that arise after polarization compensator 206 in the beam path due to the optical elements of the interferometer.

Adjustment and/or optimization of the orientations of the elements of polarization compensator 206 may be achieved by monitoring the interference signal produced by interferometry system 200 and adjusting the orientations of each of the individual elements to reduce the amplitudes of one or more spurious signal components in the interference signal. Referring again to FIG. 1, the interference signal measured by detector 256 may be analyzed using a spectrum analyzer. The spectrum analyzer can produce a frequency spectrum of the interference signal, with one or more contributions to the interference signal arising from cyclic error components. As target mirror 230 is moved, for example, one or more cyclic error components may be observed as spectral peaks in the interference signal, e.g., at harmonics, sub-harmonics, or aliases of the frequency corresponding to the sum of the heterodyne and Doppler shift frequencies.

In some embodiments, the elements of polarization compensator 206 may be adjusted in order to reduce the intensities of the spectral peaks that correspond to cyclic errors in the interference signal, relative to the intensity of the principal frequency peak corresponding to the sum of the heterodyne and Doppler shift frequencies. For example, when target mirror 230 is moving, cyclic error contributions to the interference signal may appear at frequencies that differ from the frequency of the principal peak in the spectrum of the interferometry signal. Polarization compensator 206 may be iteratively adjusted, for example, to minimize the amplitudes of the spectral peaks corresponding to cyclic errors.

In some embodiments, adjustment and/or optimization of the configuration of polarization compensator 206 may be achieved by removing the principal frequency peak from the spectrum of the interference signal. For example, when target mirror 230 is stationary, the components of the interference signal that correspond to cyclic errors are obscured by the principal peak in the spectrum of the interference signal. A beam block 204 may be inserted in either the measurement beam path or the reference beam path in order to block either the measurement or reference beam, respectively. Blocking either the measurement or the reference beam should remove the heterodyne frequency peak from the signal measured by the spectrum analyzer. However, due to imperfections in the optical elements of the interferometer, birefringence in the optical elements, and the polarization orientations of the components of source beam 212, cyclic errors may result in non-zero signal intensity at the heterodyne frequency in the spectrum of the interference signal. Adjustment of polarization compensator 206 may be used to reduce or minimize the measured signal intensity at the heterodyne frequency, thereby reducing or minimizing the contributions of cyclic error terms to the interference signal. Beam block 204 may subsequently be removed and, with target mirror 230 moving, the intensity of the residual peaks in the spectrum of the interference signal may be examined in order to determine whether the contributions of cyclic errors are small enough that the interferometry system may be used for accurate measurements in a particular application.

In general, adjustment of the individual elements of polarization compensator 206 may be performed manually, as discussed above, or may be performed in automated fashion. For example, detector 256 may be coupled to an electronic processor, and the electronic processor may be further coupled to one or more actuators positioned to adjust one or more degrees of freedom of polarization compensator 206. The electronic processor may produce electrical signals based on the interference signal measured by detector 256 in order to adjust the configuration of the elements of polarization compensator 206. The electronic processor may determine what electrical signals to provide to the one or more actuators by analyzing the frequency spectrum of the interference signal measured by detector 256. The analysis may, for example, be based on a calculated frequency transform, such as a Fourier transform, of the interference signal.

In general, it may be difficult to predict from simulations the amount of birefringence introduced by the optical components of an interferometer, and the magnitude of the resulting cyclic error contributions to the measured interference signal. The polarization compensator described above can provide a means for compensating an unknown amount of birefringence without the need to measure the birefringence directly. As an example, in the interferometry system shown in FIG. 1, the transmission and reflection properties at interface 214 of the polarizing beam splitter may typically provide for an extinction of about 45-50 dB in each of the measurement and reference beams. For example, interface 214 may transmit about 96% of p-polarized light intensity and transmit about 0.4% of s-polarized light intensity in an incident optical beam. Interface 214 may further, for example, reflect about 96% of s-polarized light intensity and reflect about 0.4% of p-polarized light intensity. However, due to birefringence introduced by the optical components of the interferometer, polarization leakage occurs in both the measurement and reference beams so that at the output of the interferometer, the extinction between components in both the measurement and reference beams may be only about 30 dB. In an HSPMI, measurement and reference beams each having an extinction of about 30 dB results in displacement measurements due to cyclic errors of about 1 nm, which may be too large for many high precision applications. By inserting a polarization compensator and adjusting the configuration of the compensator's individual elements to compensate for the birefringence introduced by the optical elements of the interferometer, the magnitude of cyclic errors in displacement measurements may be reduced to about 100 pm, or less. Adjustment of the polarization compensator may include, for example, changing the orientation of the components of the compensator by a few degrees. Alternatively, or in addition, adjustment of the polarization compensator may include adjusting the tilt angle of one or more elements of the polarization compensator, where the tilt angle is the angle between the propagation axis of an incident optical beam and a surface normal of an optical element.

Figure 3:
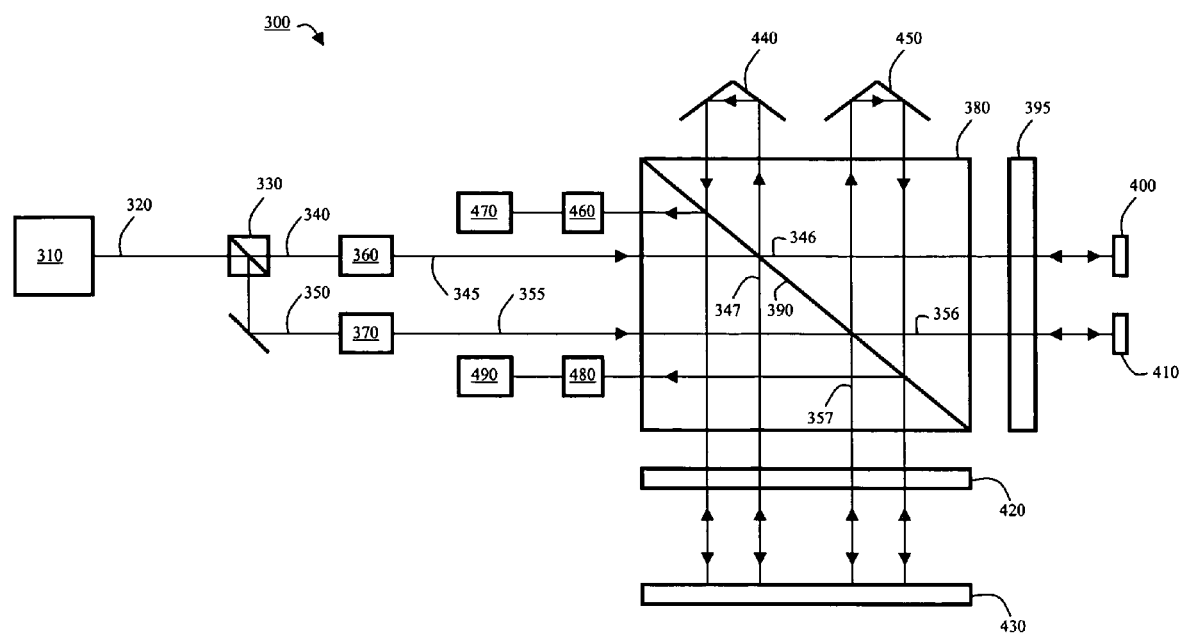
FIG. 3 is a schematic diagram of a multi-axis displacement measuring interferometry system that includes multiple polarization compensators.

Compensation of undesired polarization effects is not limited to embodiments having the high stability plane mirror interferometer shown in FIG. 1. Polarization compensator 206 may be used with any interferometer that uses a polarization beam splitter to separate an input beam into measurement and reference beams having different polarizations. For example, FIG. 3 shows an embodiment of an interferometry system 300 in which the interferometer is a multi-axis high stability plane mirror interferometer. Optical source 310 produces a source beam 320 that includes two nominally linearly and orthogonally polarized beam components having a heterodyne frequency splitting. The interferometer includes a non-polarizing beam splitter 330 that separates incident source beam 320 into a first interferometer source beam 340 and a second interferometer source beam 350. The polarization properties of the beam components of first interferometer source beam 340 and second interferometer source beam 350 may be the same as the polarization properties of source beam 320, or may be different from the polarization properties of the beam components of source beam 320. In addition, the polarization properties of beams 340 and 350 may be the same or different from one another.

First interferometer source beam 340 is directed to pass through first polarization compensator 360. In accordance with the discussion above, first polarization compensator 360 is configured to reduce the contributions of cyclic errors to the interference signal measured by a detector. First heterodyne beam 345 emerges from first polarization compensator 360 and is incident on interface 390 of polarizing beam splitter cube 380.

Some features of multi-axis interferometry system 300 are similar to those of single-axis interferometry system 200. First measurement beam 346 nominally includes only one of the beam components of first heterodyne beam 345, and is transmitted by interface 390 of polarizing beam splitter cube 380. First measurement beam 346 reflects from a first target mirror 400 and returns to interface 390, making two passes through quarter wave plate 395 on its path. The double pass through quarter wave plate 395 rotates the polarization of first measurement beam 346, which then reflects from interface 390 and is subsequently retro-reflected by reflector 440. First measurement beam 346 is transmitted again through interface 390 and reflects from reference mirror 430 back toward interface 390, making a double pass through quarter wave plate 420. As a result, the polarization of first measurement beam 346 is again rotated so that first measurement beam 346 reflects from interface 390.

First reference beam 347 reflects from interface 390 and also from reference mirror 430, double passing quarter wave plate 420 which rotates the polarization of first reference beam 347. As a result, first reference beam 347 is transmitted through interface 390 and is directed by retro-reflector 440 to be transmitted again through interface 390. First reference beam 347 again reflects from reference mirror 430, making a double pass through quarter wave plate 420 so that first reference beam 347 is reflected from interface 390.

First measurement beam 346 and first reference beam 347 are mixed by analyzer 460 to produce a mixed beam 465 that includes an interference signal. Mixed beam 465 is detected by detector 470, and the phase of the interference signal may be used to measure a displacement along a first axis of the interferometer corresponding to first target mirror 400.

Displacements along the second axis of interferometer 300, which corresponds to second target mirror 410, may be determined in a similar way. Second interferometer source beam 350 is directed to pass through second polarization compensator 370. Second polarization compensator 370 may be the same as first polarization compensator 360, or may be different. For example, if the polarization states of first and second interferometer source beams are different, then first and second polarization compensators may be different, or may be the same but may be adjusted differently in order to reduce or minimize the contributions of cyclic errors to the measured interference signal. Second heterodyne beam 355 emerges from second polarization compensator 370 and is incident on interface 390 of polarizing beam splitter cube 380. Second measurement beam 356 and second reference beam 357 follow paths that are analogous to those of the first measurement and first reference beams. Second measurement beam 356 and second reference beam 357 are mixed using analyzer 480 to produce a mixed beam 485 that includes an interference signal that is detected by detector 490. The phase of the interference signal may be used, for example, to determine a displacement of second target mirror 410 along the second interferometer axis.

In some embodiments, a single polarization compensator may be used to compensate source beam 320 prior to generating multiple interferometer source beams for a multi-axis interferometer. For example, in the embodiment shown in FIG. 3, polarization compensators 360 and 370 may be replaced by a single polarization compensator placed in the path of source beam 320 between optical source 310 and non-polarizing beam splitter 330. The adjustment procedures for the one or more polarization compensators in embodiments having a multi-axis interferometer may be similar to the adjustment procedures for a polarization compensator in a single-axis interferometry system.

In some further embodiments of the multi-axis interferometry system, the first and second target mirrors 410 and 420 are instead different locations on a common target mirror. In such cases, by determining the displacements along both the first and second interferometer axes, the interferometry system can determine changes in the angular orientation of the common target mirror.

Pre-compensation of birefringence and polarization rotation can also be applied to other multi-axis interferometers, such as, for example, those described in commonly owned U.S. Pat. No. 6,757,066, filed on Jan. 27, 2003 by Henry A. Hill, entitled "MULTIPLE DEGREE OF FREEDOM INTERFEROMETER," and U.S. Patent Application Publication No. US 2003-0218757-A1, filed on Jan. 27, 2003 by Henry A. Hill, entitled "MULTI-AXIS INTERFEROMETER," the contents of both of which are herein incorporated by reference. These applications also describe microlithography tools that use such multi-axis interferometers, which sections are also incorporated herein by reference. The pre-compensation system described herein can also be used in microlithography tools that use displacement measuring interferometers.

In some embodiments, the techniques disclosed herein can be combined with the methods and systems described in commonly owned U.S. Pat. No. 6,778,280 by Peter J. de Groot et al. entitled "INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS," filed Jun. 17, 2002, the contents of which are incorporated herein by reference, to further reduce cyclic and nonlinear errors in the measured interference signal. For example, this patent describes the use of birefringent prisms to improve isolation of the different heterodyne frequency components.

Embodiments of the techniques disclosed herein include a number of advantages. For example, a polarization compensator can be added to existing heterodyne interferometers to reduce or minimize measurement errors due to cyclic non-linearities. For example, there is no need to modify existing manufacturing methods producing heterodyne interferometer blocks. Instead, a polarization compensator may be fabricated separately as a self-contained unit and inserted into existing heterodyne interferometers where required.

A polarization compensator also increases the tolerances of an interferometer due to the ability of the polarization compensator to compensate for birefringence induced by the optical elements of the interferometer, imperfections in the optical elements, and errors in the alignment of interferometer components. As a result the interferometer may be made of glass with higher birefringence, thereby lowering material costs, and may be easier to align and maintain in a state of alignment during use. Further, the use of a polarization compensator increases the tolerances for the polarization beam splitting coatings, again lowering material costs.

In general, as discussed above, incorporation of one or more polarization compensators into interferometry systems may increase the accuracy of the interferometer by reducing cyclic non-linearities in the interference signal. As a result, such interferometry systems provide highly accurate measurements, and therefore can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p. 82 (1997).

Overlay depends directly on the performance, i.e., accuracy and precision, of the distance measuring interferometers used to position the wafer and reticle (or mask) stages. Since a lithography tool may produce $50-100M/year of product, the economic value from improved performance displacement measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as non-cyclic error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which are incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 4:
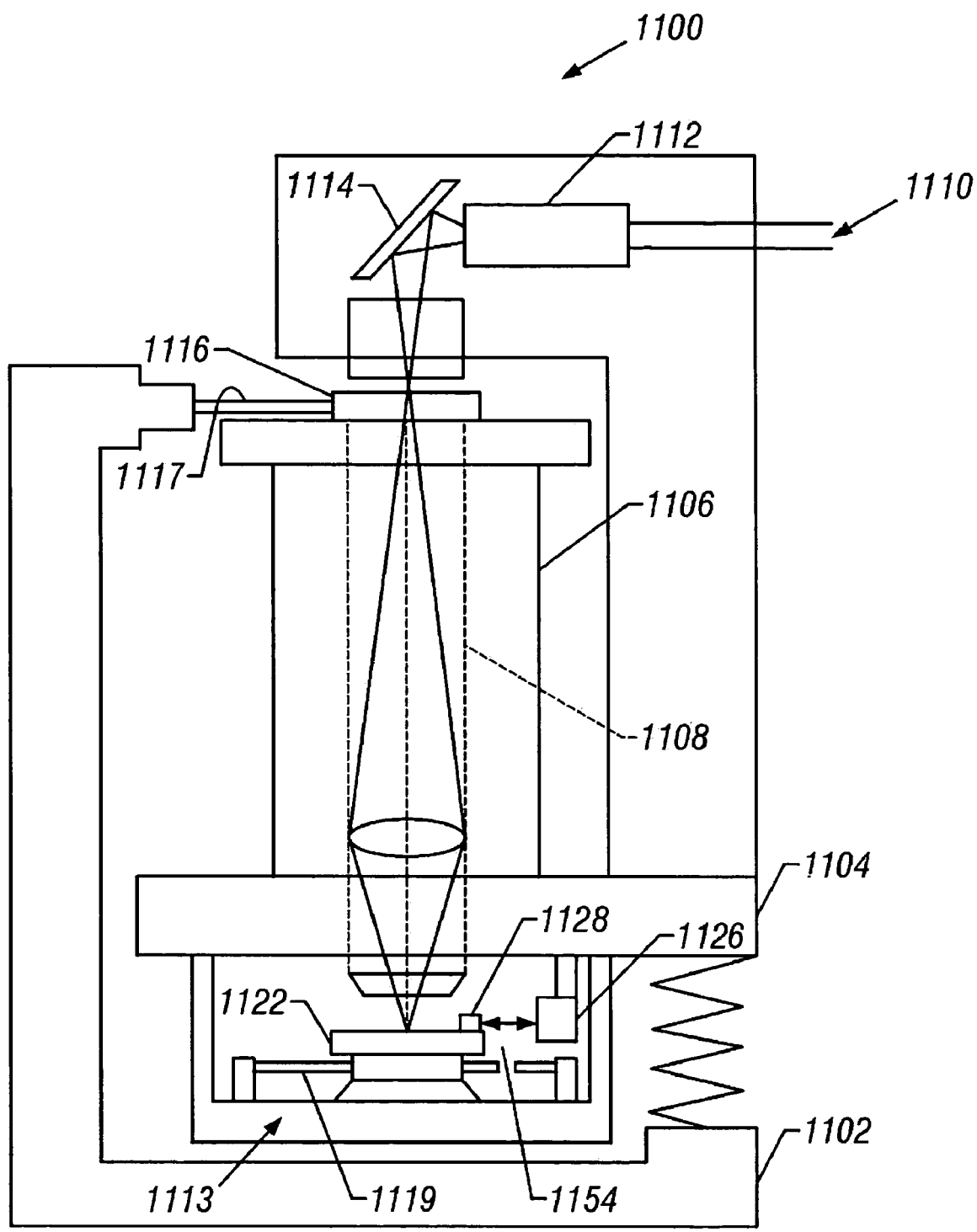
FIG. 4 is a schematic diagram of a lithography system that includes an interferometry system as described herein, and is used to make integrated circuits.

An example of a lithography scanner 1100 using an interferometry system 1126 is shown in FIG. 4. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although it is not included in this described embodiment, one or more of the interferometry systems described above can also be used to precisely measure the position of the mask stage as well as other moveable elements whose position must be accurately monitored in processes for fabricating lithographic structures (see supra Sheats and Smith, *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 5:
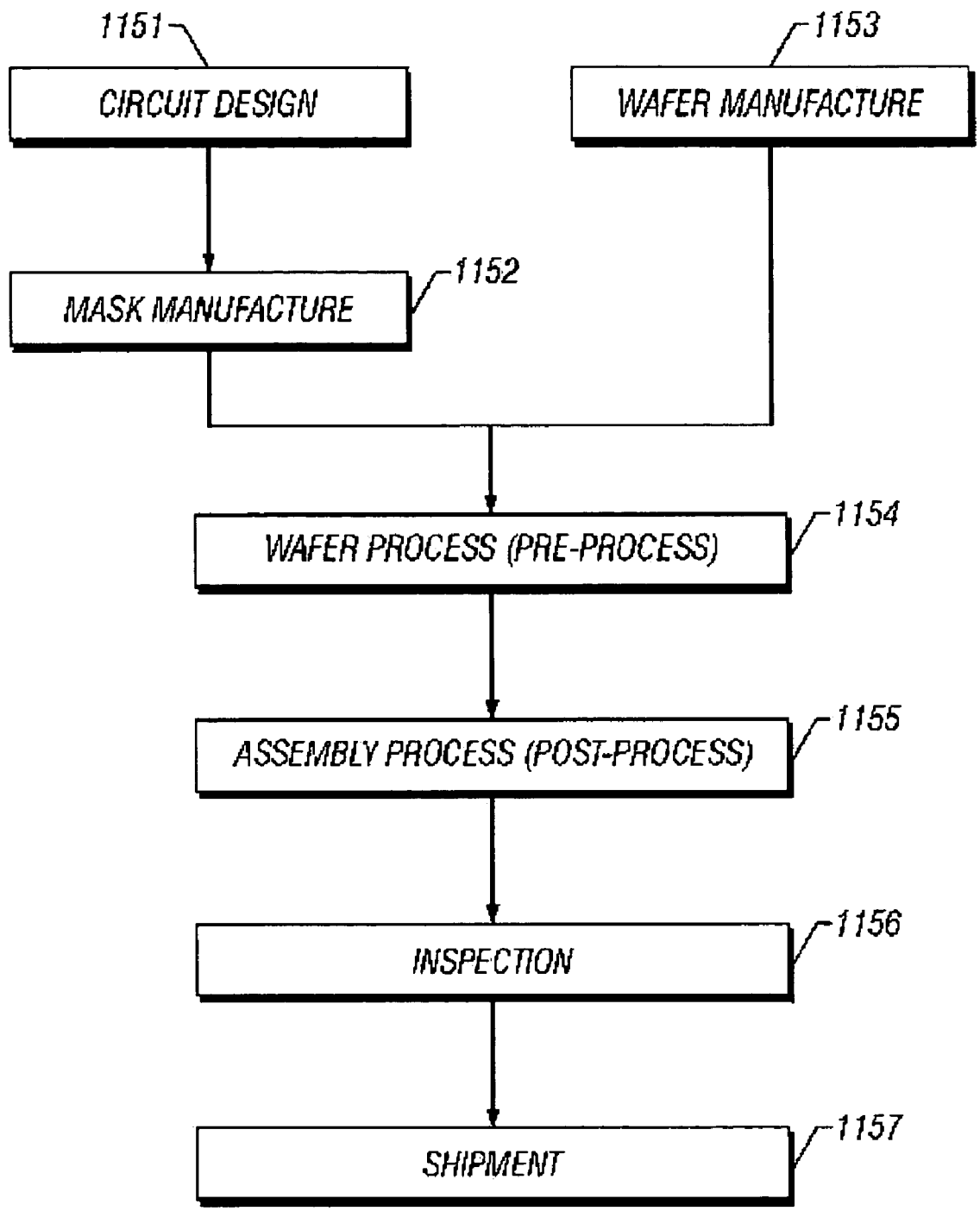
FIG. 5 is a flow chart that shows steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 5 and 6. FIG. 5 is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful for improving the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 6:
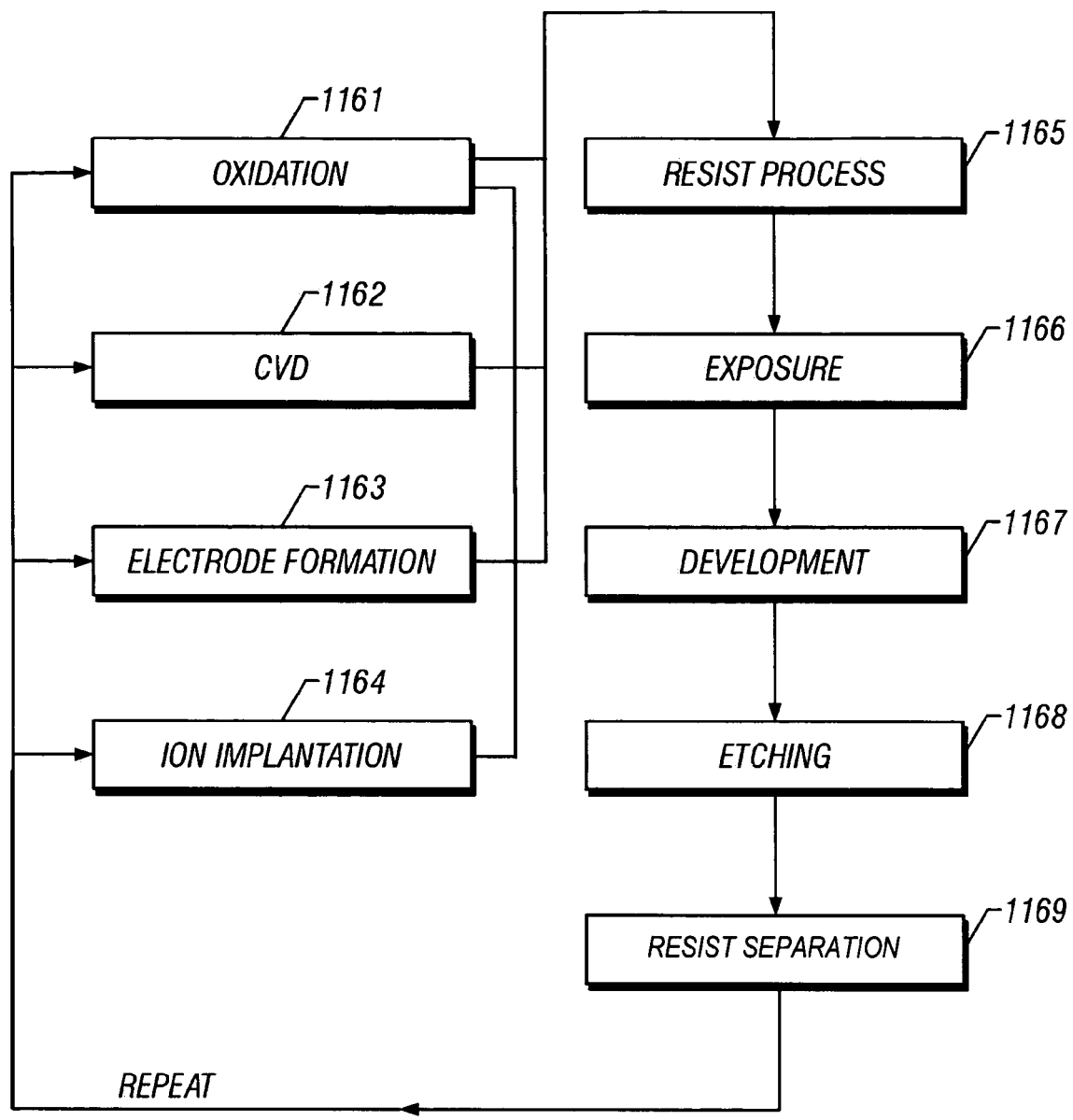
FIG. 6 is a flow chart that shows further steps for making integrated circuits.

FIG. 6 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 7:
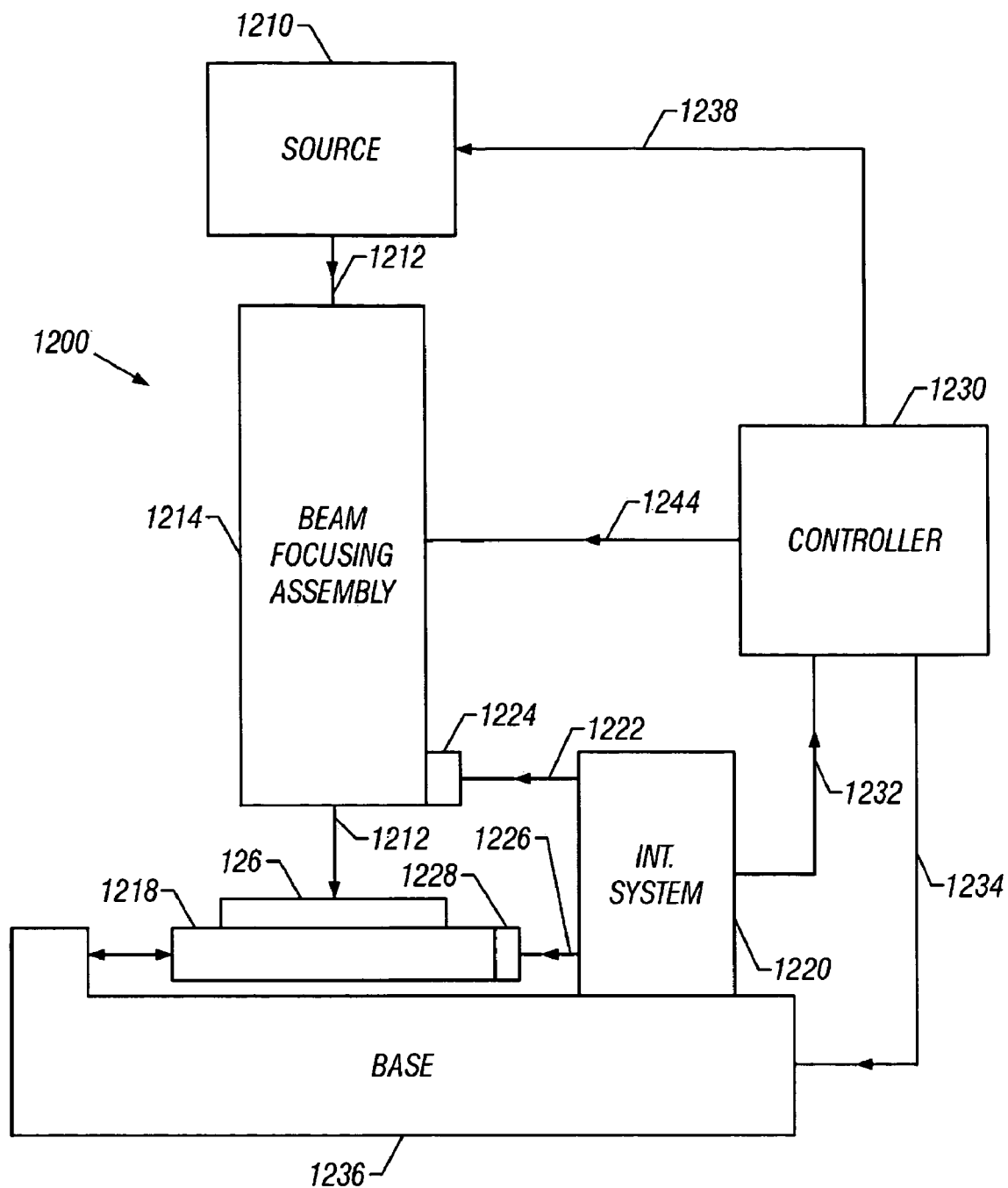
FIG. 7 is a schematic diagram of a beam writing system that includes an interferometry system as described herein.

As an example, a schematic of a beam writing system 1200 is shown in FIG. 7. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrupole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
an interferometer positioned to receive an input beam comprising two components having different frequencies and different polarizations, the interferometer including a polarizing beam splitter positioned to spatially separate the input beam into two intermediate beams, the first intermediate beam corresponding to the first component and the second intermediate beam corresponding to the second component, wherein imperfections in the interferometer cause leakage of one of the components into the intermediate beam corresponding to the other of the components; and
a polarization compensator comprising at least one retardation plate positioned to adjust the polarizations of the components of the input beam to reduce the leakage caused by the imperfections in the interferometer.

2. The apparatus of claim 1, wherein the leakage comprises leakage from the first component into the second intermediate beam and leakage from the second component into the first intermediate beam.

3. The apparatus of claim 1, wherein the at least one retardation plate is secured to an adjustable stage configured to adjust an orientation of the retardation plate.

4. The apparatus of claim 3, wherein the stage is configured to rotate the retardation plate about an axis defined by the direction of the input beam.

5. The apparatus of claim 3, wherein the stage is configured to tilt the retardation plate with respect to an axis defined by the direction of the input beam.

6. The apparatus of claim 1, wherein the retardation plate comprises a half wave plate or a quarter wave plate.

7. The apparatus of claim 1, wherein the at least one retardation plate comprises multiple retardation plates.

8. The apparatus of claim 7, wherein the multiple retardation plates comprise a half wave plate and a quarter wave plate.

9. The apparatus of claim 7, wherein the multiple retardation plates comprise a half wave plate and a birefringent film.

10. The apparatus of claim 7, wherein the multiple retardation plates comprise a half wave plate and a liquid crystal retarder.

11. The apparatus of claim 1, wherein the interferometer is a multi-axis interferometer.

12. The apparatus of claim 1, further comprising a source for the input beam.

13. The apparatus of claim 1, wherein the interferometer is a distance measuring interferometer.

14. The apparatus of claim 1, wherein the interferometer is configured to combine the two intermediate beams after they have traveled along different paths to produce an output beam.

15. The apparatus of claim 14, wherein one of the intermediate beams contacts a measurement object, and wherein the output beam comprises information about changes in position of the measurement object.

16. The apparatus of claim 14, further comprising a detector positioned to measure an intensity signal of the output beam.

17. The apparatus of claim 16, further comprising an electronic processor coupled to the detector and configured to generate a frequency spectrum corresponding to the intensity signal.

18. The apparatus of claim 17, wherein the electronic processor is further configured to cause an adjustment of an orientation of the retardation plate to reduce the leakage based on the frequency spectrum.

19. The apparatus of claim 18, further comprising a beam stop configured to adjustably block the path of one of the intermediate beams between the interferometer and the measurement object.

20. The apparatus of claim 1, further comprising a beam stop configured to adjustably block the path of one of the intermediate beams between the interferometer and a measurement object.

21. The apparatus of claim 1, wherein the imperfections comprise unwanted birefringence in one or more components of the interferometer.

22. The apparatus of claim 1, wherein the imperfections comprise misalignment between different components of the interferometer.

23. The apparatus of claim 1, wherein the imperfections comprise misalignment of one or more components of the interferometer with one or more components in a source for the input beam.

24. A method comprising:
measuring an interference signal from an interferometer positioned to receive an input beam comprising two components having different frequencies and different polarizations, the interferometer including a polarizing beam splitter positioned to spatially separate the input beam into two intermediate beams, the first intermediate beam corresponding to the first component and the second intermediate beam corresponding to the second component, wherein imperfections in the interferometer cause leakage of one of the components into the intermediate beam corresponding to the other of the components; and
adjusting a polarization compensator based on the measured interference signal, the polarization compensator comprising at least one retardation plate positioned prior to the polarizing beam splitter in the interferometer and configured to adjust the polarizations of the components of the input beam to reduce the leakage caused by the imperfections in the interferometer.

25. The method of claim 24, wherein the polarization compensator is adjusted based on an intensity of one or more spectral peaks in the interference signal.

26. The method of claim 25, wherein the polarization compensator is adjusted based on the intensity of a heterodyne frequency peak in the interference signal when a measurement beam path or a reference beam path in the interferometer is blocked.

27. The method of claim 24, wherein the at least one retardation plate comprises a half wave plate and a quarter wave plate, and adjusting the polarization compensator comprises rotating at least one of the half wave plate and the quarter wave plate about an axis nominally parallel to the propagation direction of the input beam.

28. The method of claim 24, wherein the at least one retardation plate comprises a half wave plate and a birefringent film, and adjusting the polarization compensator comprises rotating at least one of the half wave plate and the birefringent film about an axis nominally parallel to the propagation direction of the input beam.

29. The method of claim 24, wherein the at least one retardation plate comprises a half wave plate and a liquid crystal retarder, and adjusting the polarization compensator comprises at least one of rotating the half wave plate about an axis nominally parallel to the propagation direction of the input beam, and changing an optical property of the liquid crystal retarder.

30. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the interferometer apparatus of claim 1 configured to monitor the position of the wafer relative to the imaged radiation.

31. A lithography system for use in fabricating integrated circuits on a wafer, the system comprising:
a stage for supporting the wafer; and
an illumination system including a radiation source, a mask, a positioning system, a lens assembly, and the interferometer apparatus of claim 1,
wherein during operation the source directs radiation through the mask to produce spatially patterned radiation, the positioning system adjusts the position of the mask relative to the radiation from the source, the lens assembly images the spatially patterned radiation onto the wafer, and the interferometer apparatus monitors the position of the mask relative to the radiation from the source.

32. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative to one another; and
the interferometer apparatus of claim 1 configured to monitor the position of the stage relative to the beam directing assembly.

33. A lithography method for use in fabricating integrated circuits on a wafer, the method comprising:
supporting the wafer on a movable stage;
imaging spatially patterned radiation onto the wafer;
adjusting the position of the stage; and
monitoring the position of the stage using the interferometer apparatus of claim 1.

34. A lithography method for use in the fabrication of integrated circuits comprising:
directing input radiation through a mask to produce spatially patterned radiation;
positioning the mask relative to the input radiation;
monitoring the position of the mask relative to the input radiation using the interferometer apparatus of claim 1; and
imaging the spatially patterned radiation onto a wafer.

35. A lithography method for fabricating integrated circuits on a wafer, comprising:
positioning a first component of a lithography system relative to a second component of a lithography system to expose the wafer to spatially patterned radiation; and
monitoring the position of the first component relative to the second component using the interferometer apparatus of claim 1.

36. A method for fabricating integrated circuits, the method comprising the lithography method of claim 33.

37. A method for fabricating integrated circuits, the method comprising the lithography method of claim 34.

38. A method for fabricating integrated circuits, the method comprising the lithography method of claim 35.

39. A method for fabricating integrated circuits, the method comprising using the lithography system of claim 30.

40. A method for fabricating integrated circuits, the method comprising using the lithography system of claim 31.

41. A method for fabricating a lithography mask, the method comprising:
directing a write beam to a substrate to pattern the substrate;
positioning the substrate relative to the write beam; and
monitoring the position of the substrate relative to the write beam using the interferometer apparatus of claim 1.

* * * * *